United States Patent
Mazur et al.

(10) Patent No.: US 12,385,789 B2
(45) Date of Patent: Aug. 12, 2025

(54) GENERATING AMBIENT THERMAL IMAGE MAP BASED ON DEVICE TEMPERATURE DATA

(71) Applicant: Rockwell Automation Technologies, Inc., Mayfield Heights, OH (US)

(72) Inventors: David C. Mazur, Mequon, WI (US); Roberto S. Marques, Cedarburg, WI (US); Chris Softley, Midlothian (GB)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 520 days.

(21) Appl. No.: 17/950,834

(22) Filed: Sep. 22, 2022

(65) Prior Publication Data
US 2024/0102864 A1   Mar. 28, 2024

(51) Int. Cl.
*G01J 5/48*   (2022.01)
*G01J 5/00*   (2022.01)
*H04N 5/33*   (2023.01)

(52) U.S. Cl.
CPC ....... *G01J 5/485* (2022.01); *G01J 2005/0077* (2013.01); *G01J 2005/0092* (2013.01); *H04N 5/33* (2013.01)

(58) Field of Classification Search
CPC .............. G01J 5/485; G01J 2005/0077; G01J 2005/0092; G01J 5/025; H04N 5/33
See application file for complete search history.

(56) References Cited

U.S. PATENT DOCUMENTS

| | | | | |
|---|---|---|---|---|
| 10,282,957 B1* | 5/2019 | Kirkbride | ............. | G01J 5/0066 |
| 2008/0244104 A1* | 10/2008 | Clemente | .......... | H04L 12/40013 |
| | | | | 710/11 |
| 2023/0407222 A1* | 12/2023 | Gardin | ................... | C12M 23/42 |

FOREIGN PATENT DOCUMENTS

| | | | | |
|---|---|---|---|---|
| DE | 112016003422 T5 * | 6/2018 | ............ | G01J 5/0096 |
| GB | 2548870 A * | 10/2017 | ............ | G01J 5/0066 |

* cited by examiner

*Primary Examiner* — Kiho Kim
(74) *Attorney, Agent, or Firm* — Fletcher Yoder, P.C.

(57) ABSTRACT

A system may include temperature sensors configured to measure temperatures of devices within an industrial automation system. The devices may be disposed within enclosures separate from one or more spaces of an ambient space of the industrial automation system. The system may include thermal image sensors configured to acquire thermal imagery data associated with the ambient space. The system may include a processor configured to receive a first set of temperature data acquired by the temperature sensors over a period of time. The processor may further generate a second set of temperature data representative of one or more predicted temperatures associated with one or more additional spaces of the ambient space. The temperature model may represent expected temperatures of the one or more spaces with respect to the temperatures within the enclosures. The processor may generate a heat map visualization including one or more thermal indicators representative of the predicted temperatures.

20 Claims, 3 Drawing Sheets

GENERATING AMBIENT THERMAL IMAGE MAP BASED ON DEVICE TEMPERATURE DATA

BACKGROUND

This disclosure generally relates to controlling and monitoring an industrial automation system. More particularly, embodiments of the present disclosure relate to systems and methods for monitoring ambient temperatures of an industrial automation system. High quality infrared cameras are often positioned in various locations of the industrial automation system to monitor the ambient temperature surrounding various machines and devices of the industrial automation system. These infrared cameras are often cost-prohibitive to place throughout the industrial automation system. As such, improved methods for monitoring the ambient area temperatures in a cost-effective manner are desired.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a method may include receiving, via at least one processor, a first set of temperature data acquired by one or more temperature sensors. The one or more temperature sensors may measure a one or more temperatures of a plurality of devices located within one or more enclosures part of an industrial automation system. The method may further include receiving, via the at least one processor, a set of thermal imagery data associated with one or more spaces of the industrial automation system from one or more thermal image sensors. The method may include generating, via the at least one processor, a temperature model representative of one or more expected temperatures of the one or more spaces based on the first set of temperature data and the set of thermal imagery data. The method may include receiving, via the at least one processor, a second set of temperature data acquired by the one or more temperature sensors. The method may include generating, via the at least one processor, a third set of temperature data representative of one or more predicted temperatures associated with one or more additional spaces based on the temperature model and the second set of temperature data. The method may include generating, via the at least one processor, a heat map visualization including one or more thermal indicators representative of the one or more predicted temperatures.

In another embodiment, a system may include one or more temperature sensors which may measure one or more temperatures of one or more within an industrial automation system, such that the one or more devices may be disposed within one or more enclosures separate from an ambient space associated with the industrial automation system. The system may include one or more thermal image sensors which may acquire thermal imagery data associated with one or more spaces in the ambient space. The system may include a processor. The processor may receive a first set of temperature data acquired by the one or more temperature sensors over a period of time. The processor may generate a second set of temperature data representative of one or more predicted temperatures associated with one or more additional spaces in the ambient space based on a temperature model and the first set of temperature data, such that the temperature model is representative of one or more expected temperatures of the one or more spaces with respect to one or more temperatures within the one or more enclosures. The processor may generate a heat map visualization including one or more thermal indicators representative of the one or more predicted temperatures.

In yet another embodiment, one or more non-transitory, computer readable media contain instructions that, when executed by one or more processors, may cause the one or more processors to receive a first set of temperature data acquired by one or more temperature sensors, such that the one or more temperature sensors may measure one or more temperatures of one or more devices disposed within one or more enclosures part of a first industrial automation system. The instructions, when executed by one or more processors, may cause the one or more processors to receive a set of thermal imagery data associated with one or more spaces of the first industrial automation system from one or more thermal image sensors. The instructions, when executed by one or more processors, may cause the one or more processors to generate a temperature model representative of one or more expected temperatures of the one or more spaces of the first industrial automation system based on the first set of temperature data and the set of thermal imagery data. The instructions, when executed by one or more processors, may cause the one or more processors to receive a second set of temperature data acquired by a one or more additional temperature sensors, such that the one or more additional temperature sensors may measure one or more additional temperatures of one or more additional devices disposed within one or more additional enclosures part of a second industrial automation system. The instructions, when executed by one or more processors, may cause the one or more processors to generate a third set of temperature data representative of one or more predicted temperatures associated with one or more additional spaces of the second industrial automation system based on the temperature model and the second set of temperature data. The instructions, when executed by one or more processors, may cause the one or more processors to generate a heat map visualization including one or more thermal indicators representative of the one or more predicted temperatures.

BRIEF DESCRIPTION OF THE DRAWINGS

These and other features, aspects, and advantages of the present disclosure may become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is generally directed toward systems and methods of monitoring ambient temperatures of an industrial automation system. As discussed above, infrared cameras may be positioned in various locations of an industrial automation system to monitor ambient temperatures surrounding various machines and devices of the industrial automation system. These infrared cameras are often cost-prohibitive to place throughout the industrial automation system. By way of example, a number of drive devices may be distributed across four enclosure line-ups. In existing systems, various components of industrial automation devices may include some heat sensing capabilities. Although the industrial automation devices may include heat or temperature sensors embedded therein, these sensors may be designed to measure the heat or temperature present on or adjacent to a specific component, such as a processor, a printed circuit board, or the like. However, in some embodiments, these measurements may be correlated or associated with ambient temperatures of the space outside of the component or industrial automation device itself. As such, in some embodiments of the present disclosure, the temperature measurements of various industrial automation devices and components (e.g., drives) positioned inside cabinetry and other enclosure commonly found in the industrial automation environment may be recorded over time to generate datasets (e.g., time series data) representative of the temperature measurements of the respective components or devices over time.

In some embodiments, these temperature measurements may be correlated with temperature measurements of open areas surrounding the devices or outside of enclosures storing the devices. These component-level temperature measurements may be compared to temperature measurements or infrared energy measurements acquired from infrared cameras or other temperature sensors positioned in the ambient areas. By way of example, the initial comparison or correlation may be used to train a temperature model that tracks the correlation between the two temperature measurements. In some embodiments, the training period may extend over a period of time that includes various operational cycles of the devices operating within the industrial automation system, various weather patterns and temperature values outside of the facility, and the like. In this way, the temperature model may accurately predict the changes in the ambient temperature based on the measured temperature of components that are not located in the ambient areas.

After generating the temperature model, the temperature model may be used to simulate or derive temperatures for the ambient areas surrounding the devices based on the temperature measurements of the enclosed components or devices. The derived temperatures may be used to present a heat map visualization on a three-dimensional visualization representative of the respective industrial automation system. In this way, the entire industrial automation system facility may be monitored with regard to temperature without employing specific temperature measurement sensors throughout the facility. Moreover, the heat map visualization may provide macro-level context to any particular device to coordinate control of operations of a variety of devices in the industrial automation system. That is, any particular device may not adjust its own operational parameters in view of temperature measurements that are measured within the device itself. Instead, the collective measurements of temperatures of internal or enclosed devices may be used to identify specific portions or stations within the industrial automation system that may be associated with an ambient temperature that is above some threshold. In view of this simulated or virtual ambient temperature, a supervisory control system may diagnose the issue and send commands to a number of different devices to adjust their operations to allow the overall industrial automation system to remain operational, even at the cost of productivity to ensure that the industrial automation system can be systematically maintained while limiting the risk of shutdown.

Although the foregoing description is detailed with regard to temperature, it should be noted that other parameters may also be modeled and provided in a visualization. For instance, air flow, humidity, moisture, and other measurable quantities within an enclosure may be measured or inferred based on the temperature measurement or some other measured variable. With this in mind, the three-dimensional visualization representative of the respective industrial automation system may include air flow data and include this data in its ambient temperature modeling operations. Additional details with regard to monitoring ambient temperatures will be discussed in more detail with reference to FIGS. 1-5 below.

Figure 1:
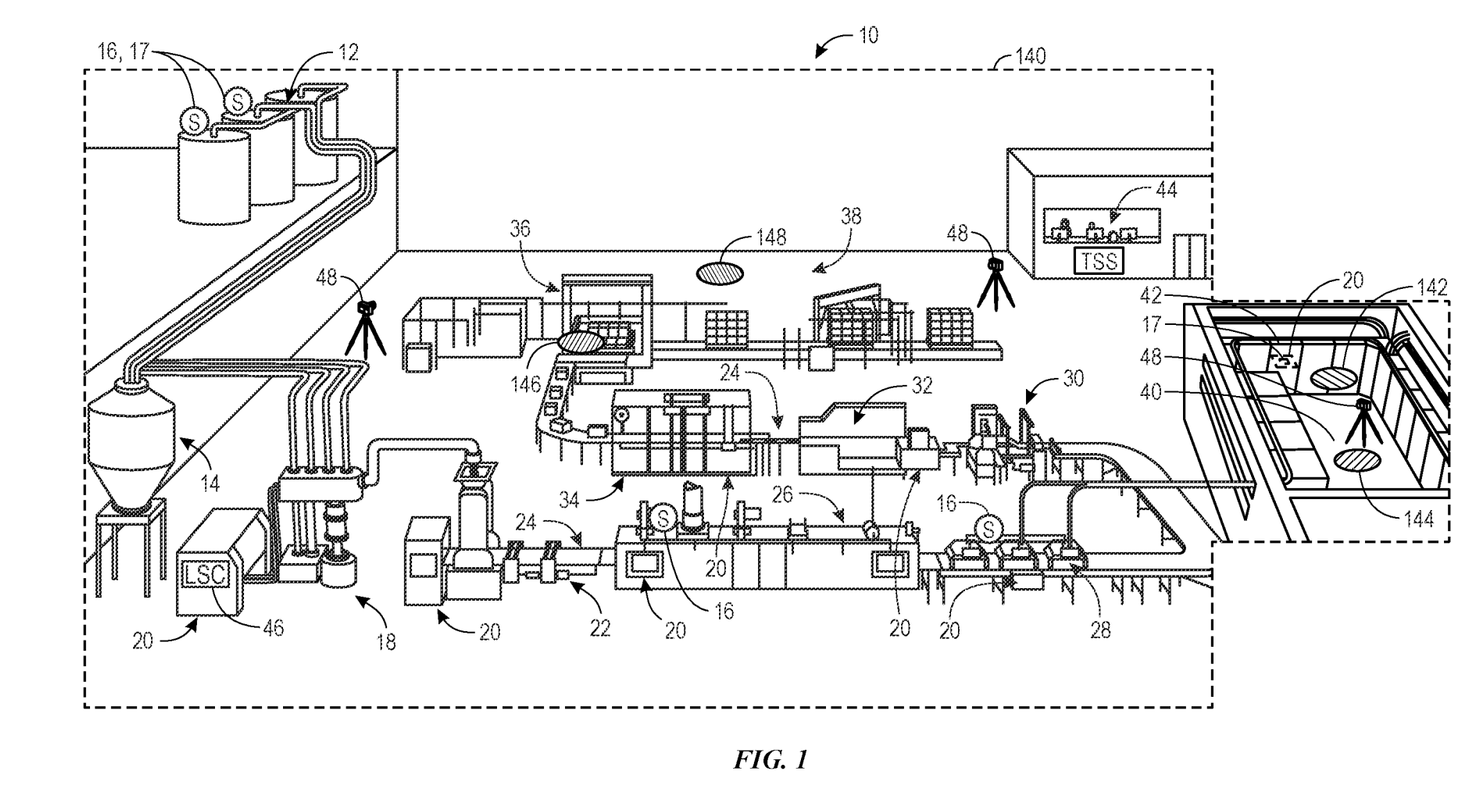
FIG. 1 is a perspective view of an example industrial automation system, in accordance with an embodiment.

By way of introduction, FIG. 1 is a perspective view of an example industrial automation system 10 employed by a food manufacturer. It should be noted that although the example industrial automation system 10 of FIG. 1 is directed at a food manufacturer, the present embodiments described herein may be employed within any suitable industry, such as automotive, mining, hydrocarbon production, manufacturing, and the like. The following brief description of the example industrial automation system 10 employed by the food manufacturer is provided herein to help facilitate a more comprehensive understanding of how the embodiments described herein may be applied to industrial devices to significantly improve the operations of the respective industrial automation system. As such, the embodiments described herein should not be limited to be applied to the example depicted in FIG. 1.

Referring now to FIG. 1, machines of the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. The raw materials may be provided to a mixer 18, which may mix the raw materials together according to a specified ratio. The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper, which may wrap the stacked boxes with shrink-wrap to keep the stacked boxes together while on the pallet. The shrink-wrapped boxes may then be transported to storage or the like via a forklift or other suitable transport vehicle.

The silos 12, tanks 14, mixer 18, depositor 22, conveyor 24, oven 26, cooling tunnel 28, tray loader 30, tray wrapper 32, case packer 34, palletizer 36, and shrink wrapper henceforth may be referenced as machines. These machines and other machines in the industrial automation system 10 may employ certain industrial automation devices 20 to control and/or monitor the operations of the machines. The industrial automation devices 20 may include controllers, input/output (I/O) modules, motor control centers, motors, human machine interfaces (HMIs), operator interfaces, contactors, starters, sensors, actuators, conveyors, drives, relays, protection devices, switchgears, compressors, actuators, firewall, network switches (e.g., Ethernet switches, modular-managed, fixed-managed, service-router, industrial, unmanaged, etc.) and the like. While the machines are located on a plant floor 38 of the industrial automation system 10, some or all of the industrial automation devices 20 may be located within a designated area of the industrial automation system 10, separately from the machines. In some embodiments, the designated area may be power/control room 40. Groups of industrial automation devices 20 may often be subdivided into enclosures 42, such as cabinets, sections, compartments, or the like, that may contain one or more industrial automation devices 20. For example, the power/control room 40 may have 1 through N sections, such that each section of the device room may have 1 through M enclosures 42, and each enclosure 42 may contain one or more industrial automation devices 20.

To perform the operations of each of the machines in the example industrial automation system 10, the industrial automation devices 20 may be used to provide and/or regulate power to the machines used to perform certain tasks, provide protection to the machines from electrical surges, prevent injuries from occurring with human operators in the industrial automation system 10, monitor the operations of the respective device, communicate data regarding the respective device to a supervisory control system 44 or a thermal modeling system, and the like. For example, one or more of the machines may include motors (e.g., AC motors). Then, a motor drive (e.g., AC drive, variable speed drive, inverter, power converter, and the like) may be an embodiment of one of the industrial automation devices 20, such that the motor drive may regulate speeds of one or more of the motors. The motor drive may receive instructions via a control system, receive AC or DC power, convert AC to DC, convert DC to AC, produce pulse width modulation (PWM) signals, supply power to the motor(s), and/or so forth. In some embodiments, each industrial automation device 20 or a group of industrial automation devices 20 may be controlled using a local control system 46. The local control system 46 may receive data regarding the operation of the respective industrial automation device 20, other industrial automation devices 20, user inputs, and other suitable inputs to control the operations of the respective industrial automation devices 20.

In some embodiments, sensors 16 may be positioned within the industrial automation system 10 to measure certain properties such as temperature, heat, mass, volume, pressure, humidity, and the like. Of particular importance with regard to the present disclosure, temperature sensors 17 may measure temperatures of various locations in the industrial automation system 10, including outside or inside the machines, the enclosures 42, and/or ambient space throughout the facility. The temperature sensors 17 may include thermocouples, resistance temperature detectors (RTDs), thermistors, semiconductor based integrated circuits (ICs), and the like. In some embodiments, the industrial automation devices 20 may include temperature sensors 17 configured to measure the temperature of a specific component, such as a processor, a printed circuit board, or the like. For example, a thermocouple may measure the temperature on a processor of a motor drive in one of the enclosures 42 in the power/control room 40. In other embodiments, the industrial automation system 10 may additionally or alternatively include heat sensors or other types of thermal sensors to collect thermal data.

The industrial automation system 10 may further include infrared (IR) cameras 48 to monitor ambient temperatures and/or infrared energy of at least a portion of the industrial automation system 10. One or more IR cameras 48 may be positioned anywhere in the industrial automation system 10, including the enclosure 42 or power/control room 40. The IR cameras 48 may produce a thermal image, such as a heat map or an infrared energy visualization, or temperature measurements to indicate ambient temperatures of multiple points in space. In contrast, one of the temperature sensors 17 may measure temperature of a single point. In other words, one of the IR camera 48 may capture, at some resolution, an ambient temperature profile as a function of position in space whereas one of the temperature sensors 17 may merely convey the temperature at one position. However, the temperature sensors 17 in combination may produce holistic information about the industrial automation system 10. It is now observed that ambient temperatures, such as temperatures monitored by the IR cameras 48 may be correlated with temperatures measured by the temperature sensors 17, including temperature sensors that are not in the same ambient space, such as within the enclosures 42, the power/control room 40, or the industrial automation devices 20 themselves. In some embodiments, the local control system 46, the industrial automation devices 20, and other components may be stored within the enclosures 42 of the power/control room 40. As such, the temperature measurements acquired from the temperature sensors 17 in the enclosures 42 of the power/control room 40 may be correlated with physical spaces located in the industrial automation system 10 and monitored by the IR cameras 48. Although the present embodiments described herein will be detailed with the use of the IR cameras 48, it should be understood that the embodiments described herein may also be performed with any suitable temperature measurement device that may provide an indication of the real time temperature measurement of a physical space.

Figure 2:
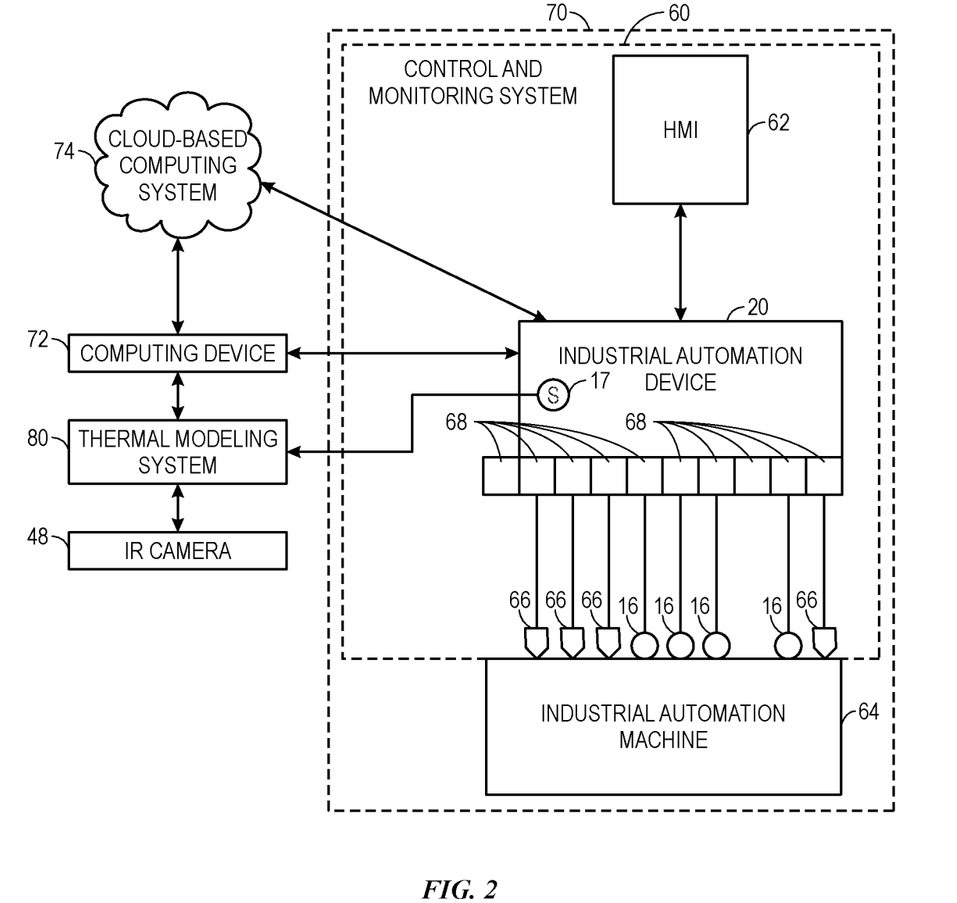
FIG. 2 is a diagrammatical representation of an exemplary control and monitoring system, in accordance with an embodiment.

FIG. 2 is a diagrammatical representation of an exemplary control and monitoring system 60, in accordance with embodiments presented herein. In FIG. 2, the control and monitoring system 60 is illustrated as including a human machine interface (HMI) 62 and an industrial automation device 20 adapted to interface with sensors and/or actuators that may monitor and/or control various types of industrial automation machine 64. While the illustrated embodiment depicts the control and monitoring system 60 having one industrial automation device 20 in communication with one industrial automation machine 64, it should be noted that other embodiments may include multiple industrial automation devices 20 in communication with one industrial automation machine 64 or one industrial automation device 20 in communication with multiple industrial automation machines.

The industrial automation machine 64 may be one of the machines depicted in FIG. 1, such as the mixer 18, depositor 22, conveyor 24, or the like. As discussed above, the industrial automation machine 64 may include a variety of operational components, such as electric motors, valves, actuators, temperature elements, pressure sensors, or a myriad of machinery or devices used for manufacturing, processing, material handling and other applications. Additionally, the industrial automation machine 64 may include various types of equipment that may be used to perform the various operations that may be part of an industrial application. For instance, the industrial automation machine 64 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation machine 64 may also include motors, protection devices, switchgear, compressors, and the like. In certain embodiments, one or more properties of the industrial automation machine 64 may be monitored and controlled by certain equipment for regulating control variables. For example, the sensors 16 (e.g., temperature sensors 17) and actuators 66 may monitor various properties of the industrial automation machine 64 and the industrial automation device 20 and may be involved to adjust operations of the industrial automation machine 64, respectively. Additionally, respective locations relative to a spatial layout of the industrial automation system 10 may be associated with the industrial automation device 20, the temperature sensor(s) 17, the IR cameras 48, and/or the industrial automation machine 64. The locations may provide additional context for any data gathered via the sensors 16 and/or the IR cameras 48.

In some cases, the industrial automation machine 64 may be associated with devices used by other equipment. For instance, scanners, gauges, valves, flow meters, and the like may be disposed on the industrial automation machine 64. Here, the industrial automation machine 64 may receive data from the associated devices and use the data to perform their respective operations more efficiently. For example, a controller (e.g., industrial automation device 20) of a variable frequency drive (e.g., motor drive) may receive data regarding a temperature of a connected motor and may adjust operations of the variable frequency drive based on the data.

In certain embodiments, the industrial automation machine 64 may include a computing device and/or a communication component that enables the industrial machine 64 to communicate data between each other and other devices. The communication component may include a network interface that may enable the industrial automation machine 64 to communicate via various protocols such as EtherNet/IP®, ControlNet®, DeviceNet®, or any other industrial communication network protocol. Alternatively, the communication component may enable the industrial automation machine 64 to communicate via various wired or wireless communication protocols, such as Wi-Fi, mobile telecommunications technology (e.g., 2G, 3G, 4G, 5G, LTE), Bluetooth®, near-field communications technology, and the like.

The sensors 16 may be any number of devices adapted to provide information regarding process conditions. One or more of the sensors 16 may be temperature sensors 17, and one or more of the temperature sensors 17 may be configured to measure temperature(s) surrounding or within the industrial automation device 20, such as temperatures of a processor, printed circuit board, fan air, and other components of the industrial automation device. In some embodiments, one or more of the temperature sensor(s) 17 may be communicatively coupled to a thermal modeling system 80. In other embodiments, data collected by the temperature sensor(s) 17 may be stored on a memory device, and the thermal modeling system 80 may be configured to access the memory device. Additionally, the sensors 16 may include location sensors (e.g., GPS receiver, Wi-Fi location devices, and the like) such that a sensed location may be associated with a sensed temperature of the industrial automation device 20, the industrial automation machine 64, and/or ambient air in the industrial automation system 10. The actuators 66 may include any number of devices adapted to perform a mechanical action in response to a signal from the industrial automation device 20. The sensors 16 and actuators 66 may be utilized to operate the industrial automation machine 64. Indeed, they may be utilized within process loops that are monitored and controlled by the industrial automation device 20 and/or the HMI 62. Such a process loop may be activated based on process inputs (e.g., input from a sensor 16) or direct operator input received through the HMI 62. As illustrated, the sensors 16 and actuators 66 are in communication with the industrial automation device 20. Further, the sensors 16 and actuators 66 may be assigned a particular address in the industrial automation device 20 and receive power from the industrial automation device 20 or attached modules.

Input/output (I/O) modules 68 may be added or removed from the control and monitoring system 60 via expansion slots, bays or other suitable mechanisms. In certain embodiments, the I/O modules 68 may be included to add functionality to the industrial automation device 20, or to accommodate additional process features. For instance, the I/O modules 68 may communicate with new sensors 16 or actuators 66 added to monitor and control the industrial automation machine 64. It should be noted that the I/O modules 68 may communicate directly to sensors 16 or actuators 66 through hardwired connections or may communicate through wired or wireless sensor networks, such as Hart or IOLink.

Generally, the I/O modules 68 serve as an electrical interface to the industrial automation device 20 and may be located proximate or remote from the industrial automation device 20, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE802.3, TCP/IP, UDP, EtherNet/IP, and so forth), ControlNet, DeviceNet or other network protocols (Foundation Fieldbus (H1 and Fast Ethernet) Modbus TCP, Profibus) and also communicate to higher level computing systems. In the illustrated embodiment, several of the I/O modules 68 are configured to transfer input and output signals between the industrial automation device 20 and the industrial automation machine 64. As illustrated, the sensors 16 and actuators 66 may communicate with the industrial automation device 20 via one or more of the I/O modules 68 coupled to the industrial automation device 20.

In certain embodiments, the control/monitoring system 60 (e.g., the HMI 62, the industrial automation device 20, the sensors 16, the actuators 66, the I/O modules 68) and the industrial automation machine 64 may make up an industrial application 70. The industrial application 70 may involve any type of industrial process or system used to manufacture, produce, process, or package various types of items. For example, the industrial applications 70 may include industries such as material handling, packaging industries, manufacturing, processing, batch processing, and the like as shown, for example, in FIG. 1. In certain embodiments, the industrial automation device 20 may be communicatively coupled to a computing device 72 and a cloud-based computing system 74. In this network, input and output signals generated from the industrial automation device 20 may be communicated between the computing device 72 and the cloud-based computing system 74. In other embodiments, the thermal modeling system 80 may be implemented on the cloud-based computing system 74 or on the computing device 72.

Figure 3:
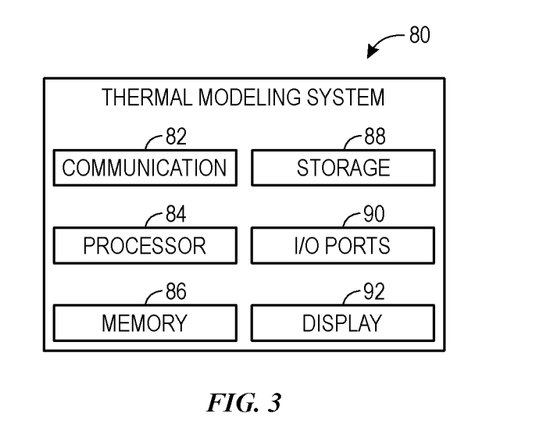
FIG. 3 is a block diagram of a thermal modeling system that operates within the industrial automation system of FIG. 1, in accordance with an embodiment.

FIG. 3 is a block diagram of a thermal modeling system 80 that may be employed in any suitable industrial automation system 10 to interface with industrial automation devices 20, computing devices (e.g., computing device 72), cloud computer systems (e.g., cloud-based computing system 74), IR cameras 48, and/or temperature sensors 17 to process thermal information and produce thermal modeling information. For example, the thermal modeling system 80 may include a communication component 82, a processor 84, a memory 86, a storage 88, input/output (I/O) ports 90, a display 92, and the like. The communication component 82 may be a wireless or wired communication component that may facilitate communication between the industrial automation devices 20, the cloud-based computing system 74, the sensors 16, the IR cameras 48, and other communication capable devices.

The processor 84 may be any type of computer processor or microprocessor capable of executing computer-executable code. The processor 84 may also include multiple processors that may perform the operations described below. The memory 86 and the storage 88 may be any suitable articles of manufacture that can serve as media to store processor-executable code, data, or the like. These articles of manufacture may represent computer-readable media (e.g., any suitable form of memory or storage) that may store the processor-executable code used by the processor 84 to perform the presently disclosed techniques. Generally, the processor 84 may execute software applications that include programs that enable a user to model a thermal state of the industrial automation system 10. The software applications may communicate with the temperature sensors 17 and/or the IR cameras 48 and gather information associated with the industrial automation device 20 as determined by the user or the supervisory control system 44. The thermal modeling system 80 may receive data in real-time, in near real-time, or in a deferred batch (e.g., via a stored data file).

The memory 86 and the storage 88 may also be used to store the data, analysis of the data, the software applications, and the like. The memory 86 and the storage 88 may represent non-transitory computer-readable media (e.g., any suitable form of memory or storage) that may store the processor-executable code used by the processor 84 to perform various techniques described herein. It should be noted that non-transitory merely indicates that the media is tangible and not a signal.

The I/O ports 90 may be interfaces that couple to other peripheral components such as input devices (e.g., keyboard, mouse), sensors 16, input/output (I/O) modules 68, and the like. I/O modules may enable the computing device 72, the thermal modeling system 80, and/or other devices to communicate with the industrial automation device 20 or other devices in the industrial automation system 10 via the I/O modules 68.

The display 92 may depict visualizations associated with software or executable code being processed by the processor 84. In one embodiment, the display 92 may be a touch display capable of receiving inputs (e.g., parameters for displaying data) from the user or the supervisory control system 44. As such, the display 92 may serve as a user interface to communicate with the industrial automation device 20, the IR cameras 48, and/or the temperature sensors 17. The display may be used to display a graphical user interface (GUI) for monitoring the industrial automation system 10. The display 70 may be any suitable type of display, such as a liquid crystal display (LCD), plasma display, or an organic light emitting diode (OLED) display, for example. In some embodiments, the user interface may be characterized as a HMI, a human-interface machine, or the like.

The illustrated thermal modeling system 80 includes dedicated components separate from the computing device 72 and the cloud-based computing system 74. However, in other embodiments, the thermal modeling system 80 may be a subsystem of the computing device 72 or the cloud-based computing system 74 and share some or all of its components therewith. For example, an embodiment may include, instead of a dedicated thermal modeling system 80, the computing device 72 performing operations of the thermal modeling system 80 with the components 82-92 described above.

Although the components described above have been discussed with regard to the thermal modeling system 80, it should be noted that similar components may make up other computing devices described herein, such as the local control system 46. Further, it should be noted that the listed components are provided as example components and the embodiments described herein are not to be limited to the components described with reference to FIG. 3. For example, other computing or control devices of the industrial automation system 10 may include one or more components that the thermal modeling system 80 includes.

Keeping the foregoing in mind, in some embodiments, the thermal modeling system 80 may generate an ambient temperature prediction model based on observations performed in the industrial automation system 10 over time. That is, the ambient temperature prediction model may be trained, in a training stage, to determine relationships between one or more outputs (e.g., ambient temperatures) and one or more inputs (e.g., parameters of the industrial automation system 10). In this way, the thermal modeling system may infer ambient temperature information based on measured or otherwise known parameters, such as temperature sensor data.

In some embodiments of the training stage, the thermal modeling system 80 may monitor attributes of the industrial automation system 10 over a period of time. The monitored attributes may include training temperature data measured by the temperature sensors 17 within the enclosures 42. Moreover, the training temperature data may be organized as a time series having temperature values associated with points in time (e.g., timestamps). The monitored attributes may further include training thermal image data collected via the IR cameras 48. Additionally, the monitored attributes may include system design data that conveys a system design (e.g., arrangement) of the industrial automation system 10. For example, the system design data may include types, dimensions, and locations of the industrial automation machines 64 and industrial automation devices 20. That is, the system design data may contain information about the physical layout of the industrial automation system 10. The monitored attributes may further include training operations data, which may include status information on machines and devices (e.g., runtime, power), production tracking, weather conditions, and other information surrounding operation of the industrial automation system 10. The training operations data may be gathered via the sensors 16, the supervisory control system 44, and/or another suitable source of data. In other embodiments, the thermal modeling system 80 may receive previously recorded data (e.g., via a memory device) for batch processing, rather than monitor the attributes in real time. In any case, the thermal modeling system 80 may employ an ambient temperature model generator to generate an ambient temperature prediction model, such that the ambient temperature prediction model is trained to predict or infer an output of one or more attributes based on inputs including other attributes. That is, the ambient temperature prediction model may consist, at least partially, of a set of mathematical relationships (e.g., functions, correlations, uncertainties) between the attributes.

The ambient temperature prediction model may capture or describe relationships between any number of the known attributes of the training data. In some embodiments, for example, each of the temperature sensors 17 and the IR cameras 48 may be associated with a respective location, and a relationship between the measurements of the temperature sensors 17 and the IR cameras 48 may be determined based on the respective locations. That is, the location of each temperature measurement may be a parameter that influences a corresponding thermal image measurement. In some embodiments, some of the measurements of the attributes may be associated with one or more time series, such sets of timestamps associated with each attribute map the measurements to points in time relative to other measurements. For example, the thermal modeling system 80 may continually sample measurements of the temperature sensors 17, the IR cameras 48, and the average output current (or any operations data) of a particular industrial automation machine (e.g., mixer 18), such that the measurements include timestamps. Then, the training temperature data, the training thermal image data, and some average output current data (or any operations data) of the particular industrial automation machine may be compared within a same time period such that a change in one attribute may be observed to influence another attribute.

After the training stage, the ambient temperature prediction model may be deployed by the thermal modeling system in a deployment stage. In the deployment stage, the thermal modeling system 80 may employ an ambient heat map generator to create an ambient heat map using the ambient temperature prediction model. In some embodiments, the ambient heat map generator may receive updated temperature data and/or production data as inputs to the ambient temperature prediction model in real time. Using the new inputs, the ambient temperature heat map generator may use the ambient temperature prediction model to generate a set of predicted ambient temperatures. Then, the ambient temperature heat map generator may generate a visualization of the predicted ambient temperatures in the form of an ambient heat map. The ambient heat map may contain temperature information overlaid on a system map of the industrial automation system 10. In other embodiments, the ambient temperature heat map generator may receive the inputs as previously recorded data (e.g., via a memory device) for batch processing, rather than process updated data in real time.

While the described embodiments predict ambient temperatures using temperatures inside the enclosures 42, other embodiments may additionally or alternatively use temperature data collected by the temperature sensors 17 disposed elsewhere in the industrial automation system 10, such as in the industrial automation machines 64 or on the plant floor 38. Furthermore, it should be understood that the ambient temperature model generator and the ambient heat map generator may not necessarily require explicitly designated components and processes as described. In an alternative embodiment, the ambient temperature model generator and the ambient heat map generator may be integrated into the ambient temperature prediction model or as part of a training step and a deployment step.

Figure 4:
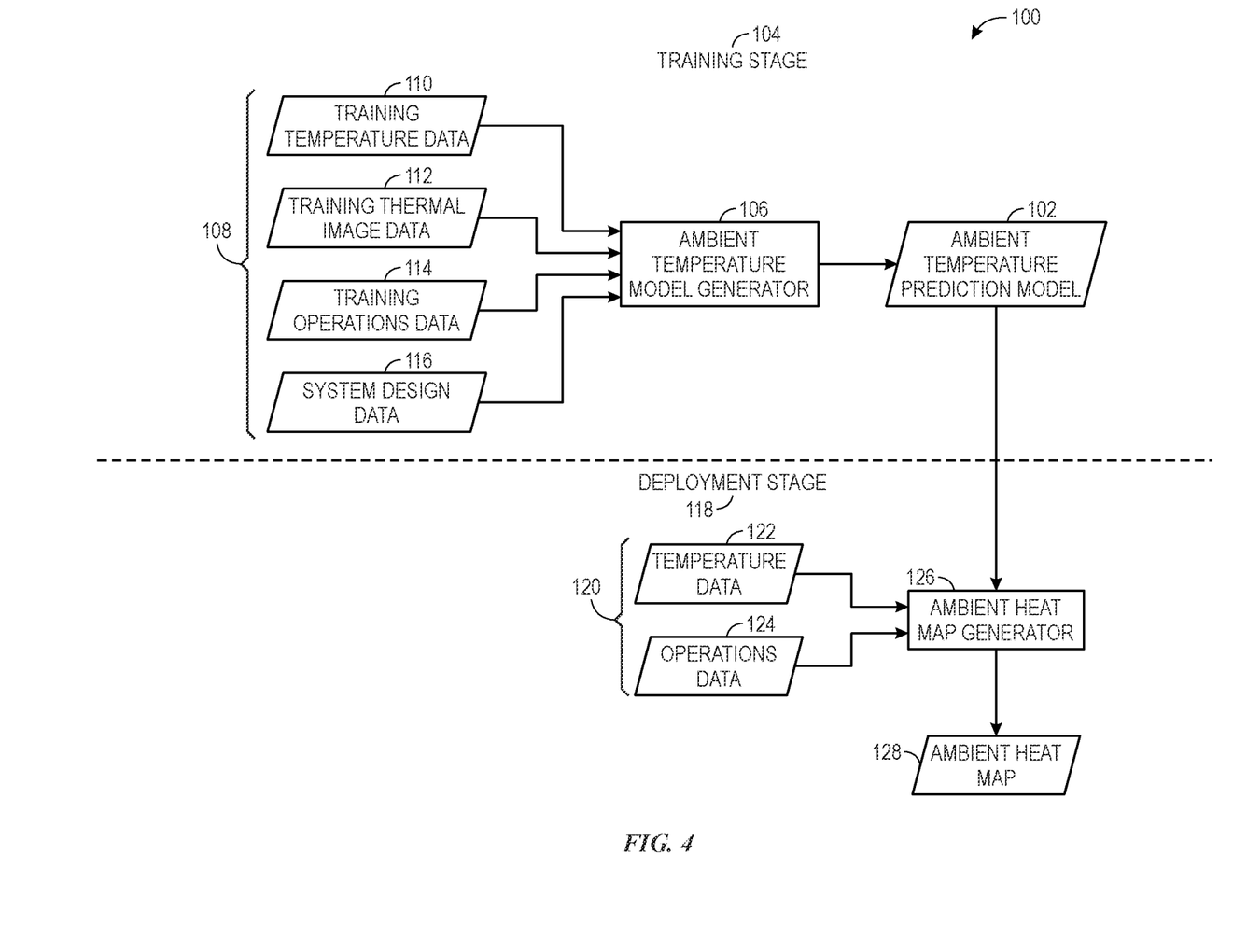
FIG. 4 is a data flow diagram of a process for generating an ambient heat map of the industrial automation system of FIG. 1, in accordance with an embodiment.

Referring now to FIG. 4, FIG. 4 illustrates a data flow diagram of a temperature modeling process 100 for training and deploying an ambient temperature prediction model 102 in accordance with an embodiment of the present disclosure. Although the temperature modeling process 100 is described below as performed by the thermal modeling system 80, it should be noted that the temperature modeling process 100 may be performed by any suitable computing device and/or processor. Moreover, although the following description of the temperature modeling process 100 is described in a particular order, it should be noted that the temperature modeling process 100 may be performed in any suitable order.

In the illustrated embodiment, the temperature modeling process 100 enters a training stage 104 in which an ambient temperature model generator 106 receives training data 108 and generates the ambient temperature prediction model 102. The ambient temperature model generator 106 may correspond to code, software, or a portion of software that receives certain datasets, performs certain analytic operations (e.g., identifying correlations, detecting patterns, creating model), and the like. As discussed above, the training data 108 may include a variety of data representing information about the industrial automation system 10 over a period of time. In some embodiments, the training data 108 is collected during an observation period in which the thermal modeling system 80 monitors attributes of the industrial automation system 10 while the industrial automation system 10 operates under certain operational parameters. The thermal modeling system 80 may receive the training data 108 as it updates in real time or the thermal modeling system 80 may receive the training data 108 after the observation period. Then, the ambient temperature model generator 106 may generate an ambient temperature prediction model 102 based on the training data 108.

As shown, the training data 108 includes training temperature data 110. In some embodiments, the training temperature data 110 is produced by the temperature sensors 17 disposed on or inside one or more of the enclosures 42, such as coupled to some of the industrial automation devices 20. Although the temperature sensors 17 may measure temperatures of components within the enclosures 42, these measurements may be correlated to ambient temperatures outside of the enclosures 42, such as ambient air of the power/control room 40 or of the plant floor 38. The training temperature data 110 may be organized as one or more time series, such that temperatures of each temperature sensor 17 is continually logged and associated with respective timestamps. The logged temperatures and timestamps may be recorded in a file having a readable data format (e.g., ascii text (.txt), comma-separated values (.csv), Microsoft Excel (.xlsx), and the like). In other embodiments, the training temperature data 110 may additionally or alternatively include data from temperature sensors 17 located outside of the enclosures 42, such as within the industrial automation machines 64. In any case, the training temperature data 110 may include location information, which may be stored as metadata within the received temperature measurements, of the respective temperature sensors 17 with respect to a spatial layout of the industrial automation system 10.

In addition to the training temperature data 110, the training data 108 may include training thermal image data 112. The training thermal image data 112 may be produced by the IR cameras 48 aimed at one or more regions of ambient space within the power/control room 40 and/or the plant floor 38. In some embodiments, the training thermal image data 112 may include thermal images that may depict ambient temperature values for the regions visible to the IR cameras 48. The thermal images may be stored as digital image files or as data structures that provide visualizations that depict relationships between temperatures and locations within the view of the IR cameras 48. Like the training temperature data 110, the training thermal image data 112 may be organized as one or more time series, such that thermal images of each IR camera 48, portions thereof, or derived data thereof are continually logged and associated with respective timestamps. Each data point of the training temperature data 110 may be mapped to a corresponding data point of the training thermal image data 112 by matching measurements of each of the temperature sensors 17 and of the IR cameras 48 based on their associated timestamps. In this way, a correlation may be established based on concurrently observing the thermal image data 112 and the training temperature data 110. The training thermal image data 112 may further include location information of the IR cameras 48 with respect to a spatial layout of the industrial automation system 10.

The training data 108 may further include training operations data 114. The training operations data 114 includes operating parameter values that may vary with respect to time, such as operational parameters (e.g., speed, average output current, input voltage, output voltage, on/off state) of industrial automation machines 64 and industrial automation devices 20, production metrics (e.g., throughput), HVAC metrics (e.g., supply air flow rate), weather conditions, and other parameters surrounding operation of the industrial automation system 10. In some cases, the operating parameter values may influence the ambient temperatures.

Furthermore, the training data 108 may include system design data 116. The system design data 116 contains information about the general nature and/or particular configuration of the industrial automation system 10. For example, the system design data 116 may include system-level configuration information, such as a type (e.g., cereal packaging plant), a size (e.g., 25,000 square feet), a facility floorplan, airflow parameters (e.g., locations of vents) of the industrial automation system 10, and the like. Additionally, the system design data 116 may include component-level configuration information, such as a type (e.g., tray loader 30), dimensions (e.g., 2 meters by 4 meters), a location (e.g., section F4) of each industrial automation machine 64 and/or industrial automation device 20 of the industrial automation system 10, relative locations of the components within the industrial automation system 10 with respect to each other, arrangements of the components, a lineup of the components, and the like. The system design data 116 may be provided by a user. For example, an operator may set parameters that indicate locations of the industrial automation devices 20, the industrial automation machines 64, the temperature sensors 16, and/or the IR cameras 48. The operator may further inform the thermal modeling system 80 of relationships between the temperature sensors 17 located in the industrial automation devices 20 inside the enclosures 42 and the temperature sensors 17 located in the machines on the plant floor 38. In this way, the system design data 116 may provide context to the training data 108.

After the training data 108 is collected, the ambient temperature model generator 106 may process and analyze the training data 108 to identify correlations and other relationships therein. In some embodiments, the ambient temperature model generator 106 may be executed as a software application by the processor 84 of the thermal modeling system 80. In other embodiments, the ambient temperature model generator 106 employs machine learning algorithms to identify patterns and relationships within the training data 108, trains a model on the training data 108, adjusts parameters of the model, and tests the model. In any case, the ambient temperature model generator 106 creates an ambient temperature prediction model 102 that represents correlations and relationships between the training temperature data 110 and the training thermal image data 112.

The ambient temperature prediction model 102 may include a set of rules and correlations that may govern or describe relationships between data points of the training data 108. In the illustrated embodiment, the ambient temperature prediction model 102 may include correlations between some ground truth thermal data (e.g., training thermal image data 112) and the other components of the training data 108: the training temperature data 110, the system design data 116, the training operations data 114, and the like. In this way, the training temperature data 110, the system design data 116, the training operations data 114, and other suitable datasets may be used as training inputs associated with the training thermal image data 112, i.e., the training output. Then, the training inputs may provide predictions for the training output. For example, the ambient temperature prediction model 102 may include a set of functions relating the training thermal image data 112 to the training temperature data 110, the training operations data 114, and the system design data 116 and a decision tree having branches which indicate an applicable subset of the set of functions based on certain conditions of the training data 108. In some embodiments, the ambient temperature prediction model 102 may be a data structure, such as a lookup table. In other embodiments, the ambient temperature prediction model 102 may be any combination of statistical models, machine learning models (e.g., regression, neural network, deep learning model), rule-based models, and/or any other suitable model. In any case, the ambient temperature prediction model 102 may be trained on the training data 108 to predict the training output based on the training input.

In a deployment stage 118, the thermal modeling system 80 may receive new inputs 120 including temperature data 122 and operations data 124 corresponding to updated operations of the industrial automation system 10 after the training stage 104. The temperature data 122 and the operations data may be collected, received, and/or stored in any of the ways as described previously for the training temperature data 110 and the training operations data 114, respectively. Specifically, in the illustrated embodiment, the temperature data 122 is gathered via the temperature sensors 17 disposed within the enclosures 42. It should be noted that the new inputs 120 may not include thermal image data. In this way, to the thermal modeling system 80 may infer approximate ground truth ambient temperatures without the use of the IR cameras 48. That is, unlike the training data 108, there may be no known output associated with the new inputs 120.

Instead, the outputs of the deployment stage 118 may include virtual or simulated data results based on the ambient temperature prediction model 102 generated during the training stage 104. As shown in FIG. 4, an ambient heat map generator 126 may use the ambient temperature prediction model 102 to predict unknown ambient temperatures based on the temperature data 122 and the operations data 124. That is, the ambient heat map generator 126 may feed the new inputs 120 into the ambient temperature prediction model 102 to create an output having predicted ambient temperatures based on the rules, correlations, and relationships of the ambient temperature prediction model 102. The predicted ambient temperatures may be visualized as an ambient heat map 128, such that the ambient heat map 128 represents different temperatures as respective colors or other visual indicators. The ambient heat map generator 126 may be a script or program executed by the processor 84 of the thermal modeling system 80 or another suitable computing device. The ambient heat map 128 may be displayed on the display 92 of the thermal modeling system 80 or some other display.

The ambient space of the industrial automation system 10 may include any space having thermal properties of interest, such that the space may be monitored by the temperature sensors 17, monitored by the IR camera(s) 48, or not monitored at all. In some embodiments, the thermal modeling system 80 may generate the predicted ambient temperatures of an additional space of the ambient space without the training data 108 having corresponding ground truth values for the space (e.g., values of the training thermal image data 112). In this case, the thermal modeling system 80 may perform a heat transfer analysis (e.g., simulation) to generate the predicted ambient temperature of the additional space. The heat transfer analysis may be based on heat transfer properties of an air flow and/or surfaces in the industrial automation system 10, such as air flow velocity, air pressure, convective heat transfer coefficients, and the like. These properties may be collected by the sensors 16 and/or recorded as part of the training data 108 (e.g., the training operations data 114, the system design data 116, etc.). The heat transfer analysis may be part of the ambient temperature prediction model 102, such that the ambient temperature prediction model 102 is trained to generate the predicted ambient temperature of the additional space based on the heat transfer properties. In other embodiments, the heat transfer analysis may be performed by the ambient heat map generator 126 to generate the predicted ambient temperature of the additional space based on the heat transfer properties. For example, the ambient heat map generator 126 may generate the predicted ambient temperatures of the ambient space based on the ambient temperature prediction model. Then, the ambient heat generator 126 may generate additional predicted ambient temperatures of the additional space based on the heat transfer analysis and the heat transfer properties (e.g., of the air flow).

The ambient heat map 128 may be presented as a visualization overlaid on a system map that represents the layout of the industrial automation system 10. That is, the ambient heat map generator 126 may superimpose a visualization representative of temperature over a portion of the system map corresponding to the region of ambient space in which the predicted ambient temperatures are represented by the ambient heat map 128. Some embodiments may include multiple heat maps for different areas of the industrial automation system 10. Still other embodiments may combine the multiple heat maps into a single heat map of the industrial automation system 10.

Referring back to FIG. 1, the illustrated industrial automation system 10 may be depicted in a visualization that includes the ambient heat map 128 generated by the ambient heat map generator 126. As shown in the visualization of FIG. 1, temperature indicators 142, 144, 146, and 148 may be overlaid on a system map 140 at various locations to visually portray the predicted ambient temperatures at those locations. As shown, temperature indicator 142 shows a representation of the predicted ambient temperature near a group of enclosures 42. To be clear, the temperature indicator 142 may not directly represent measurements of any temperature sensor(s) 17. Rather, the represented temperature is generated based on the ambient temperature prediction model 102. The predicted ambient temperature of temperature indicator 142 is represented by a certain pattern of dots, such that the certain pattern of dots means that the predicted ambient temperature is within a predetermined range. Similarly, temperature indicator 144 represents a different predicted ambient temperature in a region of the power/control room 40. Likewise, temperature indicator 146 shows the predicted ambient temperature near one of the industrial automation machines 64. The ambient heat map 128 may include any number of temperature indicators (e.g., 1, 2, 10, 300, 5000), and the number of temperature indicators may be adjusted based on a user input or on certain conditions. For example, the ambient heat map 128 may display temperature indicators where the predicted ambient temperature is above or below a predetermined threshold. In other embodiments, other visual properties, such as color, size, shading, brightness, glow, animation, line pattern, text, shape, and the like may be used to distinguish the predicted ambient temperatures.

In still other embodiments, the ambient heat map 128 may be a thermal image of the industrial automation system 10 or portion(s) thereof. That is, instead of having the temperature indicators 142-148, the ambient heat map 128 may overlay colors or other visual indicators directly onto the system map 140, as if to emulate an output of a thermal camera. For example, colors in the ambient heat map 128 may correspond to a temperature legend, such that one color (e.g., yellow) may represent a predicted ambient temperature between 80-85° F.

In some embodiments, the ambient heat map 128 may be continually updated in real time as the thermal modeling system 80 receives the new inputs 120 and generates new predicted ambient temperatures in real time. In other embodiments, the ambient heat map 128 may be a static image, which conveys the predicted ambient temperatures at a particular time in the past, the present, or expected in the future, such as a time for which the ambient heat map 128 is requested (e.g., via the supervisory control system 44). That is, the ambient heat map 128 may be a video or a static image, and the ambient heat map 128 may represent the predicted ambient temperatures at a current time or another time.

The temperature modeling process 100 of FIG. 4 may be performed in any number of different operating conditions, in different facilities, at different times, and so forth. In a further embodiment of the present disclosure, training data 108 may be collected from each of a multitude of industrial automation systems, such that each industrial automation system 10 may include different industrial automation machines 64, industrial automation devices 20, plant floor 38 layouts, power/control room layouts, sensor 16 placements, IR camera 48 placements, and so forth. That is, aggregated training data may be collected which includes sets of training data 108 gathered from the multitude of industrial automation systems having different system design data 116 and/or other attributes. Furthermore, certain steps of the temperature modeling process 100 may be performed by computing devices other than the thermal modeling system 80 of a particular industrial automation system. Methods described below may enable the thermal modeling system 80 of the particular industrial automation system to deploy the ambient heat map generator 126 without collecting the particular industrial automation system's own training data or/nor generating the thermal modeling system's own ambient temperature prediction model.

The aggregated training data gathered across the multitude of industrial automation systems may be stored in a repository of a central computing system (e.g., a server, cloud-based computing system 74) in communication with each of the multitude of industrial automation systems. Then, in some embodiments, the ambient temperature model generator 106 of a particular industrial automation system may query the repository for the aggregated training data or a portion thereof containing system design data 116 that corresponds to the system design of the particular industrial automation system. For example, the aggregated training data may include a system type that associates a set of training data 108 with a type of industrial automation system 10 from which the set of training data 108 was acquired. Then, the ambient temperature model generator 106 of the particular industrial automation system may receive the set of training data 108 if it determines that the system type associated with the set of training data 108 matches a system type of the particular industrial automation system. The system type may be part of the system design data 116 and may indicate that the industrial automation system 10 is a certain size, manufactures a certain product, includes a certain floor plan, includes certain industrial automation machines, and so forth. That is, rather than collect a new set of training data 108 using the IR cameras 17, the training stage 104 of the particular industrial automation system may receive data from the repository of aggregated training data, such that the aggregated training data includes data corresponding to the system design of the particular industrial automation system.

In other embodiments, after the aggregated training data is collected, the training stage 104 may be performed by the central computing system rather than within the thermal modeling system 80 of the industrial automation system 10. For example, a central ambient temperature model generator may be part of the central computing system. Then, the central ambient temperature model generator may generate a central ambient temperature prediction model using the aggregated training data. In this way, the central ambient temperature prediction model may be trained on the entirety of the aggregated training data to predict ambient temperatures for different industrial automation systems 10 having different system design data when the system design data 116 of the particular industrial automation system is given as an input. That is, the particular industrial automation system may not contribute to the training stage 104 or to creating the ambient temperature prediction model 102.

After the central ambient temperature prediction model is generated based on the aggregated training data, the deployment stage 118 may be performed by the thermal modeling system 100 of the particular industrial automation system 10. The ambient heat map generator 126 of the particular industrial automation system 10 may store a copy of the central ambient temperature prediction model to use in a specific context of the particular industrial automation system 10. Alternatively, the ambient heat map generator 126 may send the new inputs 120, the system design data 116, and a request for ambient temperature predictions to the central computing system and receive the ambient temperature predictions generated by the central ambient temperature prediction model in response to the request. In any case, the ambient heat map generator 126 may feed the new inputs 120 into the central ambient temperature prediction model along with the system design data 116 of the particular industrial automation system 10. Then, the ambient heat map generator 126 may produce an ambient heat map 128 such that the system design data 116 of the particular industrial automation system 10, in combination with the new inputs 120, is taken into account by the ambient temperature prediction model 102. In this way, the thermal modeling system 100 may be responsible for the deployment stage 118 and not the training stage 104.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
   receiving, via at least one processor, a first set of temperature data acquired by a plurality of temperature sensors, wherein the plurality of temperature sensors is configured to measure a plurality of temperatures of a plurality of devices disposed within one or more enclosures part of an industrial automation system;
   receiving, via the at least one processor, a set of thermal imagery data associated with one or more spaces of the industrial automation system from one or more thermal image sensors;
   generating, via the at least one processor, a temperature model representative of one or more expected temperatures of the one or more spaces based on the first set of temperature data and the set of thermal imagery data;
   receiving, via the at least one processor, a second set of temperature data acquired by the plurality of temperature sensors;
   generating, via the at least one processor, a third set of temperature data representative of one or more predicted temperatures associated with one or more additional spaces based on the temperature model and the second set of temperature data; and
   generating, via the at least one processor, a heat map visualization comprising one or more thermal indicators representative of the one or more predicted temperatures.

2. The method of claim 1, wherein the one or more additional spaces corresponds to the one or more spaces of the industrial automation system.

3. The method of claim 1, wherein the first set of temperature data and the set of thermal imagery data are acquired during a same period of time.

4. The method of claim 3, wherein the first set of temperature data comprises a first plurality of timestamps, wherein the set of thermal imagery data comprises a second plurality of timestamps, and wherein generating the temperature model comprises associating the first set of temperature data with the set of thermal imagery data based on the first plurality of timestamps and the second plurality of timestamps.

5. The method of claim 4, wherein generating the temperature model comprises determining one or more correlations between the first set of temperature data and the thermal imagery data in view of the first plurality of timestamps and the second plurality of timestamps.

6. The method of claim 1, wherein generating the third set of temperature data comprises:
   receiving air flow data related to the one or more spaces with respect to the one or more additional spaces;
   determining one or more thermal relationships between the one or more spaces with respect to the one or more additional spaces based on the temperature model and the air flow data; and
   determining the third set of temperature data based on the one or more thermal relationships and the second set of temperature data.

7. The method of claim 1, wherein the temperature model is generated based on a set of operations data comprising a speed, an average current, an input voltage, an output voltage, an on-off state of one or more industrial automation machines, a throughput metric of the industrial automation system, an airflow metric, or a combination thereof.

8. The method claim 1, comprising overlaying the heat map visualization on an additional visualization representative of a map of the industrial automation system.

9. The method of claim 1, comprising:
   receiving, via the at least one processor, a first set of locations corresponding to the first set of temperature data and a second set of locations corresponding to the second set of temperature data; and
   generating, via the at least one processor, the temperature model based on the first set of locations and the second set of locations.

10. The method of claim 9, wherein the first set of locations and the second set of locations are acquired by a plurality of location sensors.

11. A system, comprising:
    a plurality of temperature sensors configured to measure a plurality of temperatures of a plurality of devices within an industrial automation system, wherein the plurality of devices is configured to be disposed within one or more enclosures separate from an ambient space associated with the industrial automation system;
    one or more thermal image sensors configured to acquire thermal imagery data associated with one or more spaces in the ambient space;
    a processor configured to:
      receive a first set of temperature data acquired by the plurality of temperature sensors over a period of time;
      generate a second set of temperature data representative of one or more predicted temperatures associated with one or more additional spaces in the ambient space based on a temperature model and the first set of temperature data, wherein the temperature model is representative of one or more expected temperatures of the one or more spaces with respect to one or more temperatures within the one or more enclosures; and
      generate a heat map visualization comprising one or more thermal indicators representative of the one or more predicted temperatures.

12. The system of claim 11, wherein the processor is configured to:
    receive a third set of temperature data acquired by the plurality of temperature sensors, over an additional period of time prior to the period of time;
    receive a set of the thermal imagery data acquired by the one or more thermal image sensors during the additional period of time; and
    generate the temperature model based on the first set of temperature data and the thermal imagery data.

13. The system of claim 11, wherein the industrial automation system comprises a plurality of industrial automation machines in communication with the plurality of industrial automation devices, wherein the plurality of industrial automation machines comprises one or more motors and the plurality of industrial automation devices comprises one or more variable frequency drives configured to control speeds of the one or more motors.

14. The system of claim 13, wherein the one or more enclosures are disposed in a room separate from the plurality of industrial automation machines.

15. The system of claim 11, wherein the one or more thermal image sensors comprise infrared cameras configured to measure infrared energy associated with the one or more spaces of the industrial automation system.

16. The system of claim 11, wherein the one or more additional spaces corresponds to the one or more spaces of the industrial automation system.

17. The system of claim 11, wherein the temperature model represents one or more correlations between the first set of temperature data and the thermal imagery data.

18. One or more non-transitory, computer readable media containing instructions that, when executed by one or more processors, cause the one or more processors to:
  receive a first set of temperature data acquired by a first plurality of temperature sensors, wherein the first plurality of temperature sensors is configured to measure a first plurality of temperatures of a first plurality of devices disposed within one or more enclosures part of a first industrial automation system;
  receive a set of thermal imagery data associated with one or more spaces of the first industrial automation system from one or more thermal image sensors;
  generate a temperature model representative of one or more expected temperatures of the one or more spaces of the first industrial automation system based on the first set of temperature data and the set of thermal imagery data;
  receive a second set of temperature data acquired by a second plurality of temperature sensors, wherein the second plurality of temperature sensors is configured to measure a second plurality of temperatures of a second plurality of devices disposed within one or more additional enclosures part of a second industrial automation system;
  generate a third set of temperature data representative of one or more predicted temperatures associated with one or more additional spaces of the second industrial automation system based on the temperature model and the second set of temperature data; and
  generate a heat map visualization comprising one or more thermal indicators representative of the one or more predicted temperatures.

19. The one or more non-transitory, computer readable media of claim 18, wherein the instructions cause the one or more processors to:
  store the temperature model and information related to a plurality of industrial devices within the one or more enclosures, the industrial automation system, or both in a database comprising a plurality of temperature models; and
  retrieve the temperature model based on a relationship between the plurality of industrial devices and an additional plurality of industrial devices that are part of the second industrial automation system.

20. The one or more non-transitory, computer readable media of claim 18, wherein the instructions cause the one or more processors to overlay the heat map visualization on an additional visualization representative of a map of the second industrial automation system.

* * * * *